April 7, 1970 J. A. McCRUDDEN 3,505,469
CIRCUIT FOR DECREASING THE INCOMING MATCHING
LOSS OF A TELEPHONE OFFICE
Filed Jan. 20, 1967 4 Sheets-Sheet 1

*INVENTOR*
J. A. McCRUDDEN
*BY* Curphey + Erickson
*PATENT AGENTS*

INVENTOR
J. A. McCRUDDEN
BY Curphey & Erickson
PATENT AGENTS

INVENTOR
J. A. McCRUDDEN
BY Curphey & Erickson
PATENT AGENTS

INVENTOR
J. A. McCRUDDEN
BY Curphey & Erickson
PATENT AGENTS

United States Patent Office 3,505,469
Patented Apr. 7, 1970

3,505,469

CIRCUIT FOR DECREASING THE INCOMING MATCHING LOSS OF A TELEPHONE OFFICE

John A. McCrudden, Clarkson, Ontario, Canada, assignor to The Bell Telephone Co. of Canada, Montreal, Quebec, Canada Filed Jan. 20, 1967, Ser. No. 610,594
Int. Cl. H04q 3/66
U.S. Cl. 179—18 9 Claims

ABSTRACT OF THE DISCLOSURE

In a crossbar switching system, the circuit of the dial tone marker and the circuit of the completing marker, when handling originating calls, are arranged so that they are normally unable to use some of the channels through the linkage of the office so as to reserve such channels to complete incoming calls and so improve the Incoming Matching Loss. This is done by preventing the last two relays of the Channel Selection Circuit of the dial tone marker from being energized unless the marker has recycled. Similarly the last two channels of the Channel Selection Circuit of the completing marker cannot be energized, while handling an originating call, unless the marker has recycled.

This invention relates to a method for increasing the call carrying capacity of the crossbar switching system.

In the commonly known crossbar switching system a connection is considered as originating on a line link frame and completing to a register or a trunk on a trunk link frame. The paths available from a subscriber on a line link frame to a register or a trunk on a trunk link frame are called channels. A common switch control circuit called a marker is used in one of its functions to find an idle channel through the linkage of the crossbar office and establish a connection therethrough. However, since a large number of subscribers are served by a relatively low number of channels through the crossbar office, the marker sometimes fails to establish a connection. The failure to find a channel for an originating type of call is called an Originating Matching Loss (OML) and the failure to find a channel for an incoming type of call is called an Incoming Matching Loss (IML).

The crossbar offices are engineered to provide a service limited to an IML of 2% or an OML of 1% whichever is the greater. However, the IML always exceeds 2% much sooner than the OML exceeds 1% and it has become necessary to improve the ability of the crossbar office to terminate more incoming calls. If more incoming calls can be terminated the service in that office is automatically improved and/or more subscribers can be provided service.

In accordance with the invention, the circuit of the dial tone marker is modified so that it is normally unable to use some of the channels through the linkage of the office so as to reserve such channels to complete incoming calls and so improve the Incoming Matching Loss. The marker is arranged however to have access to all channels when it recycles after having failed to establish a dial tone connection when a first group of channels has been tested.

The circuitry of the completing marker is also modified so that, while handling an originating class of call, it is unable to gain access to some of the channels so as to reserve such channels to complete incoming calls. As in the dial tone marker, the completing marker is arranged to have access to all channels when it recycles after having failed to establish a dial tone connection when the first group of channels has been tested.

The invention will now be described with reference with the drawings which illustrate a preferred embodiment of the invention and in which.

Figure 1:
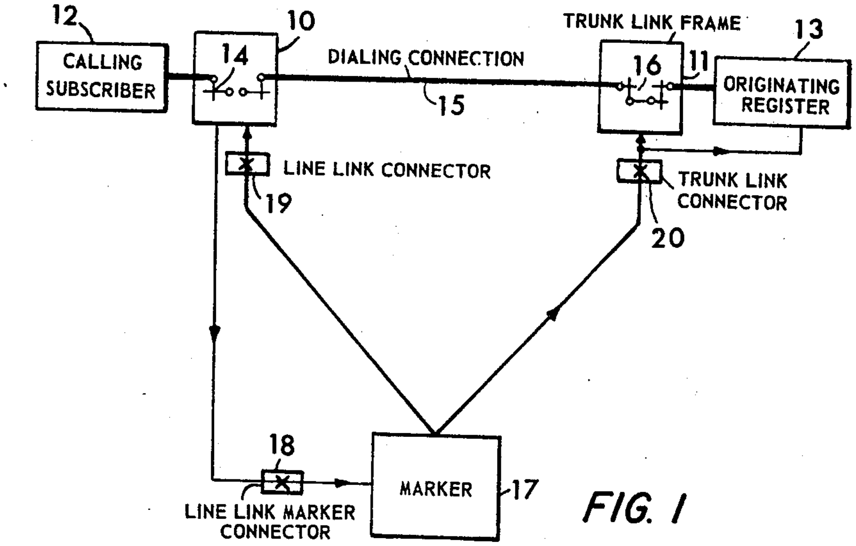
FIGURE 1 is a block diagram illustrating how is established the dialing connection.
Figure 2:
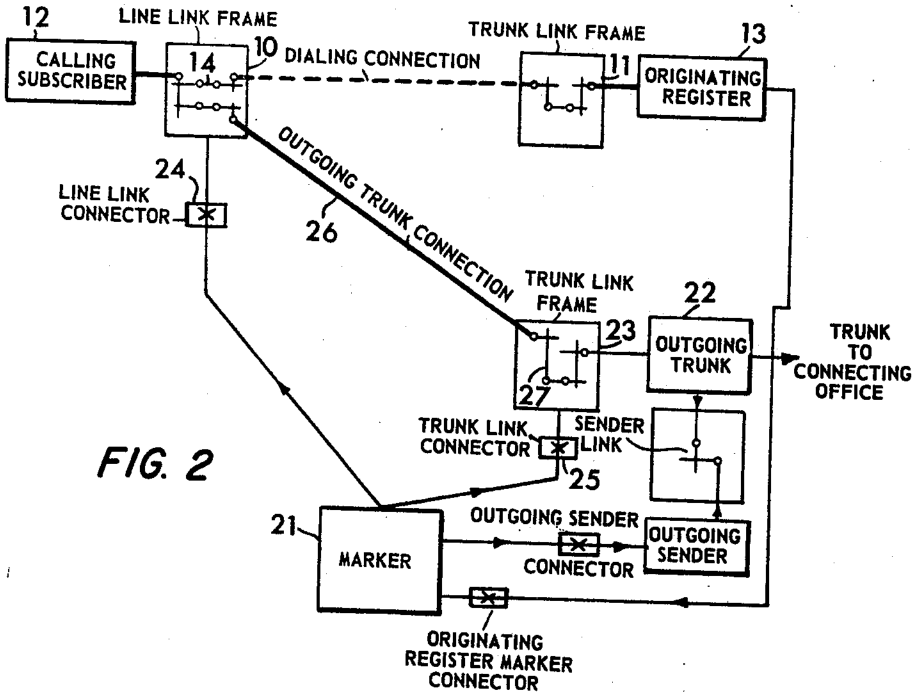
FIGURE 2 is a block diagram illustrating how is established an outgoing trunk connection.
Figure 3:
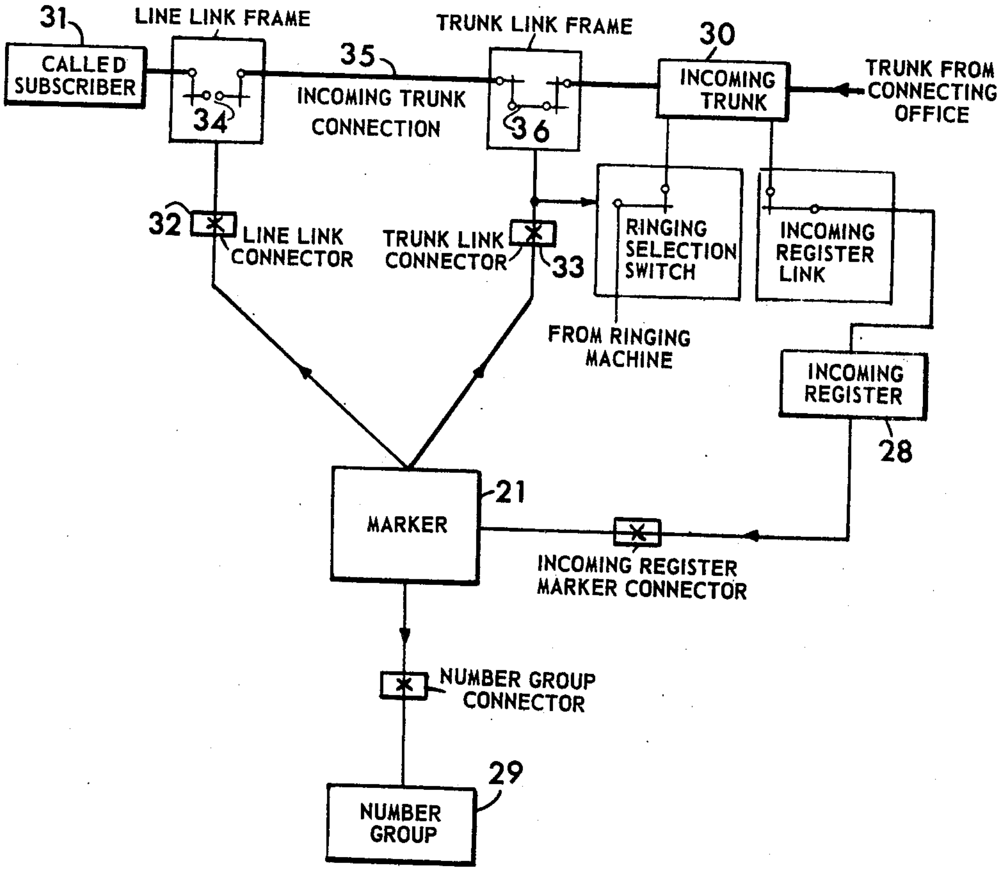
FIGURE 3 is a block diagram illustrating how is established an incoming trunk connection.

In considering the basic paths through a crossbar office let us consider FIGURE 1. A connection is considered as originating on a line link frame 10 and completing to a register or a trunk on a trunk link frame 11. The paths available to the calling subscriber 12 on the line link frame 10 to an originating register 13 on the trunk link frame 11 are as follows:

On the line link frame 10 the calling subscriber 12 has access to ten line links 14. The ten line links 14 in turn have access to ten or more junctors leading to a specific trunk link frame 11. The junctors 15 have access to ten or more trunk links 16 which in turn have access to the originating register 13.

A path as described above is also called a channel and such channels are designated numerically 0 to 9. These channels are tested in groups of ten by a marker 17 in order to determine a free path from the calling subscriber to an originating register. The order of selection during the test is on the first available-first used basis. In other words if the order of channel selection was 0 to 9 and channels 0, 1 and 2 were busy then channel 3 would be the next chosen. If the order of channel selection was 5–9, 0–4 and channels 5, 6, 7 were busy then channel 8 would be the next chosen.

The channels are always composed of a basic group of ten. Other groups are also available and are called subgroups. For example, if there were fourteen junctors 15 between a specific line link frame 10 and a specific trunk link frame 11, it would usually consist of one subgroup of ten channels and a second subgroup of four channels. This second subgroup could be divided into two subgroups of two but the basic subgroup would consist of ten channels.

It should be noted that the number of line links to which the calling subscriber has access and the number of trunk links having access to the selectors is fixed by the nature of the switch and is usually ten.

It must also be noted that a channel is formed of a line link, a junctor and a trunk link. When channel 3 for example is being tested by the marker, line link #3, junctor #3 and trunk link #3 must all be idle and available in order to form a free channel. If either the line link, the junctor or the trunk link is not free, the marker will test the following channel.

The above is well known in the art and may be found for example in U.S. Patent No. 2,585,904 issued Feb. 19, 1952 to A. J. Busch. In order to fully understand the invention, the process for establishing a dialing connection, an outgoing call connection and an incoming call connection will now be reviewed in sequence. Such processes are well known however and may also be found in the Busch patent for example.

ESTABLISHING A DIALING CONNECTION (FIG. 1)

In the process of establishing a dialing connection, the dial tone marker 17 recognizes that a calling subscriber 12 is to be connected to an originating register 13 on a certain trunk link frame 11.

The dial tone marker 17 is connected to the line link frame 10 and trunk link frame 11 via various connectors 18, 19 and 20 and is able to determine the idle or busy condition of the channels between the calling subscriber 12 and the originating register 13. Usually the first basic subgroup which is composed of ten channels is examined and an idle channel is selected and established by the dial tone marker as the dialing connection. If there are no idle channels to be found the dial tone marker has the facility to examine the idle or busy condition of channels using another subgroup, if provided, and to establish a dialing connection should a channel be found idle.

If the dial tone marker is unable to find an idle channel after performing the action described above, it has a second opportunity to establish the dialing connection called recycling. This recycling action consists of locating another idle originating register 13 on another idle trunk link frame 11. A new attempt is then made by the marker to establish a dialing connection between the calling subscriber 12 and the new originating register 13. During this action the same line links 14 are examined but a new group of junctors 15 and trunk links 16 are used.

If the dial tone marker is unable to find an idle channel after performing the above action there is no further attempt at this time to establish a dialing connection and appropriate action is carried out by the dial tone marker.

ESTABLISHING AN ORIGINATING CALL (OUTGOING TRUNK) CONNECTION (FIG. 2)

In accordance with the information received from the orginating register 13, the completing marker 21 attempts to establish a connection between the calling subscriber 12 and an outgoing trunk 22 located on trunk link frame 23. The procedure of establishing a connection between these two is similar to that explained in the dialing connection. In this case the action is carried out by a completing marker rather than a dial tone marker. In some applications, such as the system described in the above Busch patent, the dial tone and completing markers are combined in a single marker.

The completing marker has access to the line link frame 10 and trunk link frame 23 via connectors 24 and 25 and is able to determine the idle or busy condition of line links 14, junctors 26, and trunk links 27 in an effort to find an available channel. If on examining the basic subgroup of ten channels it finds that none is idle, the completing marker will examine the second subgroup if provided.

If no idle channel is found after this action the completing marker has the facility of recycling and choosing another outgoing trunk 22 on another trunk link frame 23.

If during the attempts described above the completing marker is unable to find an idle channel on which to establish the outgoing trunk connection, the completing marker will then take other appropriate action and will usually no longer attempt to establish this connection. This failure to find a channel for an originating call is called Originating Matching Loss (OML).

ESTABLISHING AN INCOMING CALL CONNECTION (FIG. 3)

The process of establishing an incoming trunk contion is carried out by the completing marker. In accordance with the information received from the incoming register 28 and with the help of the number group 29, the completing marker 21, in its function, determines that a call on an incoming trunk 30 is to be completed to a called subscriber 31. In similar manner to other calls the completing marker examines the channels between the incoming trunk 30 and the called subscriber 31 via connectors 32 and 33. The channel is composed as for the other types of calls. Ten line links 34 have access to ten or more junctors 35 which, in turn, have access to ten or more trunk links 36 which have access to the incoming trunk 30.

The basic subgroup of ten channels is examined first to determine their idle or busy condition and an idle channel is chosen if available. If no idle channel is found the completing marker will examine a second subgroup of channels if they are provided, seeking an idle channel.

If no idle channel is found at this time, however, the call cannot be established. Failure to establish an incoming trunk connection is called an Incoming Matching Loss (IML).

It will be seen in the foregong that an incoming call does not have equivalent opportunity to be completed through the switching network as an originating or dial tone call. This is due to the originating and dial tone calls being recycled by the appropriate markers in order to have a better opportunity to find an idle channel.

However a grade of service must be maintained in a telephone switching office and a reasonable criterion has been arrived at: the Incoming Matching Loss should not exceed an average of greater than two percent of the incoming calls during the heaviest traffic periods. At the same time the Originating Matching Loss should not exceed an average of one percent of the originating class calls during the heaviest traffic period.

As the number of originating calls is usually more than twice the number of incoming calls and coupled with the facility of recycling, it is usually found that the incoming matching loss approaches two percent much sooner than the originating matching loss approaches one percent.

It is therefore the purpose of the Incoming Channel Reservation Circuit, in accordance with the invention, to improve the possibility of finding an idle channel to complete an incoming call.

Figure 4:
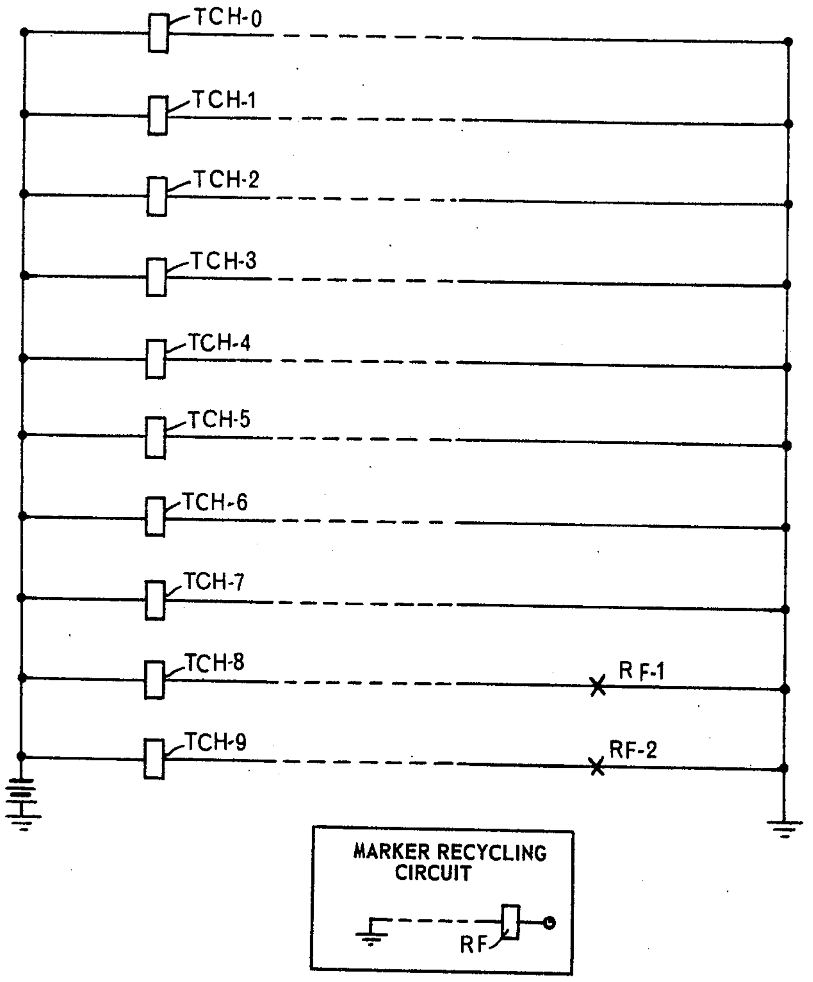
FIGURE 4 illustrates the modification of the channel selection circuit of the dial tone marker in accordance with the invention.
Figure 5:
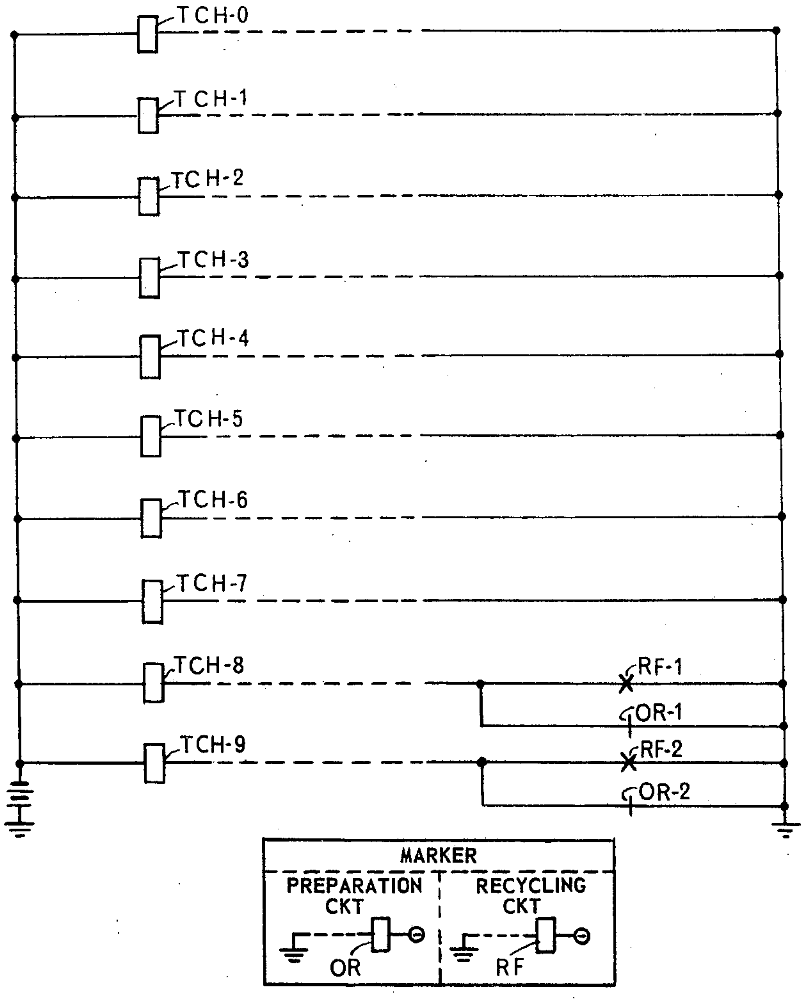
FIGURE 5 illustrates the modification of the channel selection circuit of the completing marker in accordance with the invention.

To accomplish the above feature, slight changes have been made to the channel selection circuits of the dial tone and completing markers as illustrated in FIGURES 4 and 5 respectively.

In FIGURE 4 is illustrated the channel selection circuit comprising ten test channel relays TCH0–TCH9. The channel selection circuit is well known and its full description may be found in columns 40 and 41 of the above mentioned Busch patent with reference to FIGURES 65 and 81 thereof. FIGURE 4 only shows the portion of the circuit which is necessary to the understanding of the invention and for supporting the claims.

As illustrated in the drawing the last two channel selection relays TCH–8 and TCH–9 are not connected directly to ground as illustrated in FIGURE 65 of the Busch patent but are connected to ground through normally open contacts RF–1 and RF–2 of a relay RF which operates when the marker recycles as it is described more fully in column 206 of the Busch patent with reference to FIGURE 149.

It is therefore seen that test channel relays TCH0–TCH7 only will be operated at the time of initiating the channel selection. The dial tone marker will consequently have no access to channels 8 and 9 thus reserving such channels for the traffic coming in the opposite direction from incoming calls. If the dial tone marker recycles however, relay RF will operate and close contacts RF–1 and RF–2 thus causing energization of relays TCH8, TCH9 and permitting access to the last two channels.

In FIGURE 5 is illustrated the channel selection circuit comprising the ten test channel relays TCH0–TCH9 associated with the completing marker. The circuit is similar to the circuit of FIGURE 4 except that the last two channels TCH8 and TCH9 have extra connections to ground through closed contacts OR–1 and OR–2 of originating relay OR which operates when the marker is called in by an originating register as described in column 71 lines 21–24 of the above mentioned Busch patent.

Relays TCH8 and TCH9 cannot operate on an originating type of call and channels 8 and 9 are reserved for incoming calls. If the marker fails to find a free channel and recycles, relay RF will operate as mentioned previously with regard to the description of FIGURE 4 and close contacts RF–1 and RF–2 thus permitting access to the last two channels.

It should be noted that in the above connections, the channel selection is arranged in the 0 to 9 order. If the order of selection had been 5–9, 0–4 channels 3 and 4 would have been reserved for incoming calls.

By using connections that are part of this method, it could be arranged to make the last channel only available rather than the last two. Under certain circumstances this may be desirable although it is not as efficient.

The control of the last three channels is also conceivable but it is felt that it could have adverse effect upon the marker holding time and is therefore less desirable.

The slight restriction placed on the completion of dial tone and originating calls in favor of incoming calls results in several improvements as follows:

(1) Due to the probability of the marker recycling to a less busy trunk link frame, there is a better overall distribution of originating calls to these trunk link frames.

(2) As the markers choose idle channels on a first come-first chosen basis, more calls are completed in the lower numbered channels. This reinforces a phenomenon known as packing which improves the switching capacity of the crossbar office.

(3) Occasionally there is a slight increase in the number of Originating Matching Loss. However, this is still well within the service objective and at the same time makes a greater provision for the completion of incoming connections.

(4) There is a decrease in the number of Incoming Matching Loss. This means that the possibilities of obtaining a channel for completing an incoming connection are improved and that the switching capacity of the office has improved so that more calls can be handled while still maintaining the same objectives. In other words, more customers can be served by that office.

What is claimed is:

1. In a telephone system adapted to handle dial tone, originating and incoming calls, the combination of line link frames on which individual subscribers are terminated, trunk line frames connected to originating registers and to trunks, channels for interconnecting said subscribers to said registers or trunks through the line link frame and trunk line frame, a common switch control circuit, means in said common switch control circuit for testing a first group of channels and for establishing a connection therethrough between a calling subscriber and a register or a trunk when an idle channel is found, and means in said common switch control circuit for reserving at least one channel for incoming calls.

2. A telephone system as defined in claim 1 wherein said common switch control circuit is a dial tone marker for handling a dial tone connection to an originating register.

3. A telephone system as defined in claim 2 wherein said dial tone marker includes a relay which operates when said marker recycles in a further attempt to locate an idle originating register on a second trunk link frame when no channel in the first group of channels is available, and means for testing a second group of channels between the subscriber and the second originating register and establishing a connection if an idle channel is found.

4. A telephone system as defined in claim 3 wherein said means for testing said second group of channels comprises a channel selection circuit including a group of ten relay circuits, one for each channel.

5. A telephone system as defined in claim 4 wherein the last two relay circuits of the channel selection circuit are energized through normally open contacts of said relay which operates when said marker recycles, thereby allowing the last two channels to become available for a dialing connection only when the dial tone marker recycles, thus increasing the availability of these channels for incoming calls.

6. A telephone system as defined in claim 1 wherein said common switch control circuit is a completing marker for handling originating and incoming calls and wherein said completing marker includes an originating relay which operates upon initiation of an originating call.

7. A telephone system as defined in claim 6 wherein said completing marker includes a relay which operates when said marker is handling an originating call to select an outgoing trunk on a second trunk link frame when no channel in the first group of channels is available, and means for testing a second group of channels between the subscriber and the second outgoing trunk and for establishing a connection if an idle channel is available.

8. A telephone system as defined in claim 7 wherein said means for testing said second group of channels comprises a channel selection circuit including a group of ten relay circuits, one for each channel.

9. A telephone system as defined in claim 8 wherein the last two relay circuits of the channel selection circuit are energized through normally open contacts of said relay which operates when said marker recycles, in parallel with normally closed contacts of the originating relay which are opened upon initiation of an originating call, thereby allowing the last two channels to become available for an originating connection only when the completing marker recycles, thus increasing the availability of these channels for incoming calls.

References Cited

UNITED STATES PATENTS 2,911,477 11/1959 Gohorel et al.

KATHLEEN H. CLAFFY, Primary Examiner

T. W. BROWN, Assistant Examiner